(12) United States Patent
Wong

(10) Patent No.: US 11,379,259 B2
(45) Date of Patent: *Jul. 5, 2022

(54) WORKER THREAD MANAGER

(71) Applicant: SAP SE, Walldorf (DE)

(72) Inventor: Johnson Wong, Vancouver (CA)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/899,960

(22) Filed: Jun. 12, 2020

(65) Prior Publication Data
US 2020/0310863 A1 Oct. 1, 2020

Related U.S. Application Data

(63) Continuation of application No. 15/729,090, filed on Oct. 10, 2017, now Pat. No. 10,719,350.

(51) Int. Cl.
G06F 9/48 (2006.01)
G06F 9/455 (2018.01)

(52) U.S. Cl.
CPC ............ G06F 9/48 (2013.01); G06F 9/45529 (2013.01); G06F 9/4881 (2013.01); G06F 2209/485 (2013.01)

(58) Field of Classification Search
CPC ...... G06F 9/48; G06F 9/4881; G06F 9/45529; G06F 2209/485
See application file for complete search history.

(56) References Cited

U.S. PATENT DOCUMENTS

| | | | | |
|---|---|---|---|---|
| 6,505,295 B1* | 1/2003 | Hiraki | ...... | G06F 9/325 712/205 |
| 7,496,928 B2* | 2/2009 | Fuller | ...... | G06F 9/4881 719/319 |
| 7,779,416 B2* | 8/2010 | Koga | ...... | G06F 9/5055 718/105 |
| 8,307,364 B2* | 11/2012 | Chang | ...... | G06F 9/4881 715/205 |
| 8,359,595 B2* | 1/2013 | Kaler | ...... | G06F 9/4843 718/103 |
| 9,733,996 B1* | 8/2017 | Malecki | ...... | G06F 11/3409 |
| 9,916,183 B2* | 3/2018 | He | ...... | G06F 9/4881 |
| 10,719,350 B2* | 7/2020 | Wong | ...... | G06F 9/45529 |

(Continued)

OTHER PUBLICATIONS

Huck et al., "An Autonomic Performance Environment for Exascale", 2017, SuperFri.org (Year: 2017).*

(Continued)

*Primary Examiner* — Wei Y Zhen
*Assistant Examiner* — Junchun N Wu
(74) *Attorney, Agent, or Firm* — Buckley, Maschoff & Talwalkar LLC

(57) ABSTRACT

A system includes determination of whether a current number of active worker threads of a client application is less than a maximum active worker thread limit, retrieval, if the number of active worker threads is less than the maximum active worker thread limit, of a first job associated with a first context from a job pool, determination of whether an inactive worker thread is associated with the first context, and, if an inactive worker thread is associated with the first context, execution of the first job on the inactive worker thread.

12 Claims, 6 Drawing Sheets

(56) References Cited

U.S. PATENT DOCUMENTS

| | | | |
|---|---|---|---|
| 2003/0023661 A1* | 1/2003 | Clohessy | G06F 9/5022 718/104 |
| 2004/0194093 A1* | 9/2004 | Koutharapu | G06F 9/505 718/100 |
| 2006/0107266 A1* | 5/2006 | Martin | G06F 9/505 718/100 |
| 2009/0070766 A1* | 3/2009 | Berman | G06F 9/505 718/104 |
| 2009/0249349 A1* | 10/2009 | Bose | G06F 9/4893 718/103 |
| 2011/0145822 A1* | 6/2011 | Rowe | G06Q 10/10 718/100 |
| 2011/0296420 A1* | 12/2011 | Pegushin | G06F 11/3404 718/102 |
| 2014/0109098 A1* | 4/2014 | Sato | G06F 9/3851 718/102 |
| 2014/0181825 A1* | 6/2014 | He | G06F 9/5027 718/102 |
| 2014/0373020 A1* | 12/2014 | Govindarajeswaran | G06F 9/5027 718/102 |
| 2016/0147571 A1* | 5/2016 | Barrere | G06F 9/4881 718/104 |
| 2016/0306680 A1* | 10/2016 | Shen | G06F 9/5083 |
| 2016/0308771 A1* | 10/2016 | Tang | H04L 12/10 |
| 2018/0074974 A1* | 3/2018 | Borlick | G06F 12/084 |
| 2020/0151003 A1* | 5/2020 | Horie | G06F 9/4843 |

OTHER PUBLICATIONS

Moore et al., "Data Center Workload Monitoring, Analysis, and Emulation", 2005, PSU.edu (Year: 2005).*

Larson et al., "Memory Allocation for Long-Running Server Applications", 1998, ACM (Year: 1998).*

Itzkovitz et al., "Thread migration and its applications in distributed shared memory systems", 1998, Elsevier Science Inc. (Year: 1998).*

Pusukuri et al., "Thread Reinforcer: Dynamically Determining Number of Threads via OS Level Monitoring", 2011, IEEE (Year: 2011).*

Perez et al., "Estimating Computational Requirements in Multi-Threaded Applications", 2015, IEEE, vol. 41, No. 3 (Year: 2015).*

\* cited by examiner

WORKER THREAD MANAGER

CROSS-REFERENCE TO RELATED APPLICATION

This is a continuation of co-pending prior U.S. patent application Ser. No. 15/729,090, filed on Oct. 10, 2017, entitled "WORKER THREAD MANAGER", the contents of which are hereby incorporated herein by reference in its entirety for all purposes.

BACKGROUND

Web-based applications are commonly used by client devices to provide functionality to users. This use leads to greater demand for web-based applications which provide increasingly complex and computationally-intensive functions. A traditional single-threaded web application is typically unable to provide these functions while also meeting modern performance standards and expectations.

Some Web-based technologies (e.g., JavaScript) support worker threads for executing jobs concurrently with the main application thread. Worker threads may therefore significantly improve the performance of complex web applications. However, the web application is responsible for management of worker threads, which may result in disadvantageously complex and error-prone application logic.

DETAILED DESCRIPTION

The following description is provided to enable any person in the art to make and use the described embodiments. Various modifications, however, will remain readily apparent to those in the art.

Briefly, some embodiments provide a worker manager framework that can be used to manage web workers in a generic fashion which is applicable to arbitrary workflows and scenarios. According to some embodiments, the framework requires relatively little processing power and memory and is therefore advantageously used on client devices in which one or both resources are limited. Some embodiments may also support effective handling of complex thread-management logic via an intuitive Application Programming Interface (API).

Figure 1:
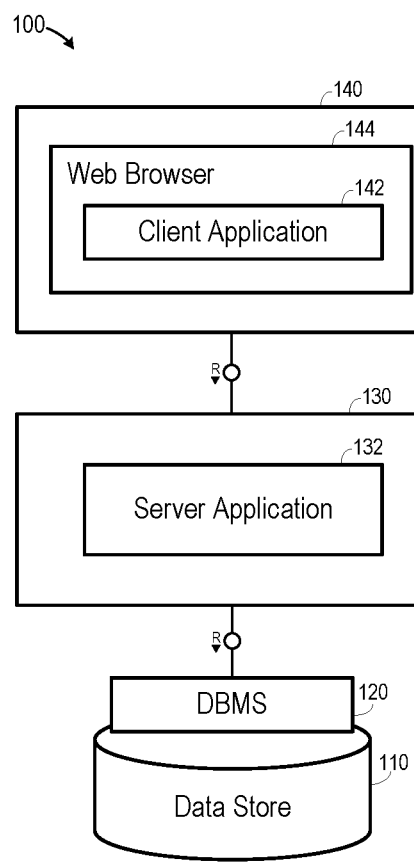
FIG. 1 is a block diagram of a system architecture according to some embodiments.

FIG. 1 is a block diagram of system 100 according to some embodiments. Embodiments are not limited to the FIG. 1 system. System 100 includes data store 110, database management system (DBMS) 120, server 130, and client system 140.

According to some embodiments, client system 140 executes client application 142 (e.g., a web application) within web browser 144 (i.e., within an execution engine of web browser 144) to provide functionality to a user of client system 140. For example, execution of client application may cause presentation of a user interface on a display device of client system 140. The user may manipulate the user interface to request data, and client system 140 passes a request based on the manipulation to server 130. Server 130 generates a structured-query language (SQL) script based on the request, and forwards the SQL script to DBMS 120. DBMS 120 executes the SQL script to return a result set to server 130 based on data of data store 110, and application 132 returns the result set, or data based thereon (e.g., a visualization) to client application 142. Server 130 may simultaneously serve many client systems according to some embodiments.

Data store 110 may comprise any one or more data sources which are or become known, including but not limited to database views, spreadsheets, relational databases and/or OnLine Analytical Processing cubes. Data store 110 and DBMS 120 may comprise any query-responsive systems that are or become known, a relational database, a multi-dimensional database, an eXtendable Markup Language (XML) document, or any other data storage system storing structured and/or unstructured data. The data of data store 110 may be distributed among several relational databases, dimensional databases, and/or other data sources. Embodiments are not limited to any number or types of data sources.

In some embodiments, the data of data store 110 may comprise one or more of conventional tabular data, row-based data, column-based data, and object-based data. Data store 110 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Figure 2:
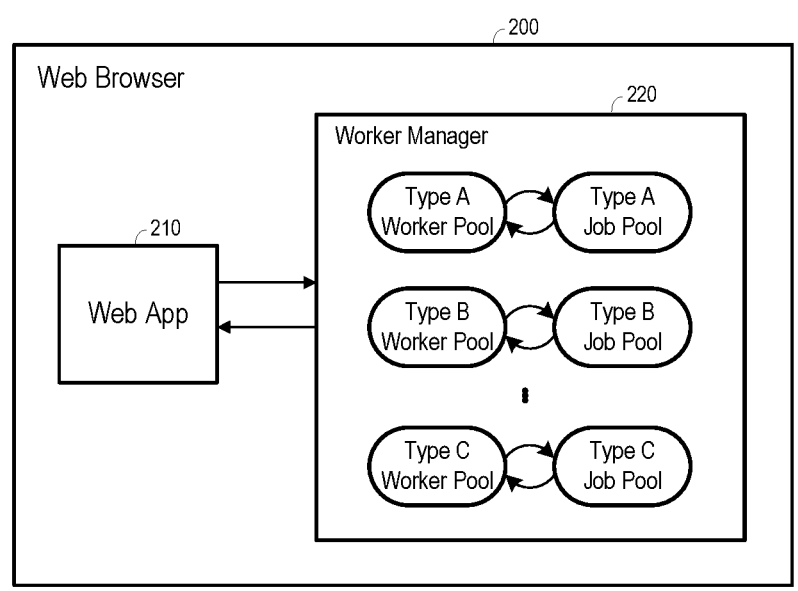
FIG. 2 is a block diagram of a system architecture according to some embodiments.

FIG. 2 is a block diagram of runtime architecture 200 according to some embodiments. Architecture 200 may be implemented within client system 140, but embodiments are not limited thereto.

As shown, web application 210 comprises program code executing within a web browser 200 as is known in the art. For example, web application may comprise a JavaScript application executing within a Java Virtual Machine of web browser 200. Worker manager 220 interfaces with web application 210 to provide job execution via worker threads. In some embodiments, worker manager 220 manages the creation, contexts and destruction of worker threads in a manner transparent to web application 210. Worker manager 220 may manage the worker threads based on predetermined resource constraints as will be described below.

According to the illustrated embodiment, worker manager 220 is exposed as a centralized service for worker thread activities. As a centralized service, worker manager 220 is able to control the impact of all worker threads on user device resources. Centralized worker manager 220 also decouples worker logic from worker management logic, which may facilitate maintenance and extensions of web application 210.

The architecture of FIG. 2 illustrates an implementation (e.g., a JavaScript implementation) in which worker threads are not generic, in the sense that any worker thread can perform any arbitrary job. Worker threads are not generic because a specific context is tied to a worker thread when the worker thread is spawned. The context comprises the executable program code which will be executed by the worker thread. The context of a worker thread cannot be changed after a worker thread is spawned, therefore the worker thread is limited to performing jobs associated with its context.

According to some embodiments, each worker thread is associated with a job type, which essentially describes the function of the worker thread (e.g., process a data query, generate a visualization). Although worker threads are tied to a context as described above, they do not have to be tied to a specific job. This allows any worker thread associated with a given context to handle any job targeted to the same context. FIG. 2 illustrates worker pools and associated job pools. For example, the type A worker pool of worker threads includes worker threads spawned in association with a particular context (e.g., context A) which is capable of handling jobs of type A. Therefore, any worker thread of the type A worker pool is capable of handling any job of the type A job pool.

In JavaScript, the storage representation within worker manager 200 may be expressed as follows:

```
{
WORKER_TYPE_A: {
  workers: [w1, w2, w3, . . . ], // Worker Pool queue
represented as array
  jobs: [j1, j2, j3, . . . ] // Job Pool queue represented as
array
},
WORKER_TYPE_B: {
  workers: [ . . . ],
  jobs: [ . . . ]
},
WORKER_TYPE_C: {
  workers: [ . . . ],
  jobs: [ . . . ]
},
. . .
}
```

As mentioned above, worker thread contexts are specified by a specific resource (e.g., a JavaScript resource) that contains all the code necessary for a worker thread to process jobs. This requires separate files to be created and deployed for each job type, which becomes increasingly costly particularly when pre-compilation is involved. To maintain flexibility in the creation of worker thread contexts, worker manager 220 may also allow for context to be specified through in-memory code. Worker manager 220 may therefore dynamically construct a JavaScript resource based on in-memory code. The following is an example thereof using JavaScript blobs:

```
// Define worker context as a piece of code in memory
let context = ( ) => {
  let multiply = (a, b) => a * b;
  self.onmessage = e => {
    self.postMessage(multiply(e.data.payload[0],
e.data.payloer[1]));
  };
};
// Construct blob from code
let blob = new Blob([ '( ' + context.toString( ) + ') ( ) ' ],
              {type: 'application/javascript'});
// Create URL to blob
let url = URL.createObjectURL(blob);
// Use URL to spawn new Worker
let worker = new Worker(url);
```

According to some embodiments, worker manager 220 not only spawns worker threads and assigns worker threads to jobs transparently of web application 210, but also constrains resource usage by the worker threads to some specified limits. These limits may be configurable by the application consumer. For example, Web browser 200 may specify limits on the maximum number of worker threads, the maximum number of active worker threads, and the maximum number of worker threads per type.

The maximum number of worker threads limit may specify a maximum number of worker threads that can be held in memory, regardless of whether any of the worker threads are actively processing a job. Memory usage and maintenance requirements increase with the number of spawned worker threads, which may degrade performance if not properly handled.

The maximum number of active worker threads limit may specify the maximum number of active worker threads that are allowed to be actively executing jobs at any given point in time. This may be a hard limit based on the number of available virtual or logical cores. For example, a CPU having four physical cores and eight logical cores can theoretically handle up to eight threads simultaneously. If more than eight threads are active, the threads will compete with each other for CPU time. This limit can be determined dynamically by determining the number of available logical cores, which is exposed through properties on modern browsers such as window.navigator.hardwareConcurrency.

The maximum of worker threads per type limit may be used to customize behavior based on the relative resource usage of each type of worker thread. In this regard, worker threads associated with some contexts may be less resource-intensive than others, in terms of either the code they hold in memory and/or their CPU usage. To maximize resource usage, it may be desirable to allow more of the light-weight worker threads to exist than the heavier worker threads.

A worker manager according to some embodiments spawns worker threads and assigns worker threads to jobs in view of limits such as those described above. For example, if no more idle workers are available to handle a job of a particular job type, new jobs should be queued and sequentially processed as jobs are completed. Similarly, a worker manager may scale worker threads up and down based on load to minimize resource usage. For example, if only one job is received at a time in sequence, only one worker thread should be spawned and active at any given point in time. If two jobs arrive at the same time, two worker threads should be spawned if possible and executed to process the two jobs in parallel. Worker threads which are idle for longer than a specified time may be terminated to free resources.

Figure 3:
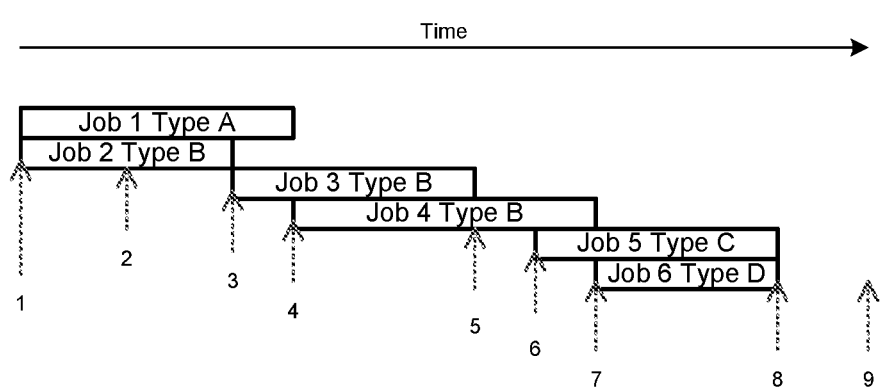
FIG. 3 illustrates worker thread spawning according to some embodiments.

FIG. 3 illustrates operation of a worker manager to spawn worker threads and assign jobs thereto according to some embodiments. Each horizontal rectangle represents a spawned worker thread. The illustrated operation assumes the following constraints: maximum number of worker threads=4 and maximum number of active worker threads=2.

At point 1, Job 1 and Job 2 are sent to the worker manager from the web application. In response, the worker manager spawns one worker thread of type A to process Job 1 and another worker thread of type B to process Job 2. As described above, the type A worker thread is spawned with a context suitable for processing jobs of type A (e.g., Job 1), and the type B worker thread is spawned with a context suitable for processing jobs of type B (e.g., Job 2).

At point 2, the web application sends Job 3 and Job 4 to the worker manager. Both of Job 3 and Job 4 are of type B.

The number of active worker threads is currently equal to the maximum active worker threads limit (i.e., 2) so Job 3 and Job 4 are queued for processing. Job 2 completes at point 3, and Job 3 is then assigned to the worker thread which processed Job 2.

Job 1 completes at point 4, which allows Job 4 to begin executing without violating the maximum number of active worker threads limit. However, no active workers of Type B are available at point 4 so the worker manager spawns another type B worker thread to process Job 4. At point 4, there are one type A worker thread and two type B worker threads in memory and the two type B worker threads are active. Job 3 completes at point 5, reducing the active worker thread count to one.

The web application sends Job 5 of type C to the worker manager at point 6. At point 6, the maximum active worker threads limit has not been reached but no worker thread of type C is available. Accordingly, the worker manager spawns a worker thread of type C.

Job 4 completes at point 7 and Job 6 of type D is sent to the worker manager. Although the maximum active worker threads limit is not reached, there is no worker thread of type D in memory. However, since there are four total worker threads in memory (i.e., one type A, two type B, and one type C), the maximum worker threads limit has been reached. Accordingly, inactive workers are pruned to reduce the number of worker threads in memory. Specifically, the type A and type B worker threads are pruned, allowing the type C worker thread, which is still active, to continue processing Job 5. The worker manager then spawns a new worker of type D to process Job 6.

At point 8, Job 5 and Job 6 complete, leaving no active worker threads and two worker threads in memory (i.e., one type C and one type D). Next, at point 9 and after a predefined timeout period, the last two inactive worker threads are pruned to free resources, reducing the number of worker threads in memory back to zero.

According to some embodiments, the worker manager includes certain methods to handle the above-described complexity. For example, the methods may include executeNextJob, createWorker, clearInactiveWorkers, and cleanupWorkers.

Figure 4:
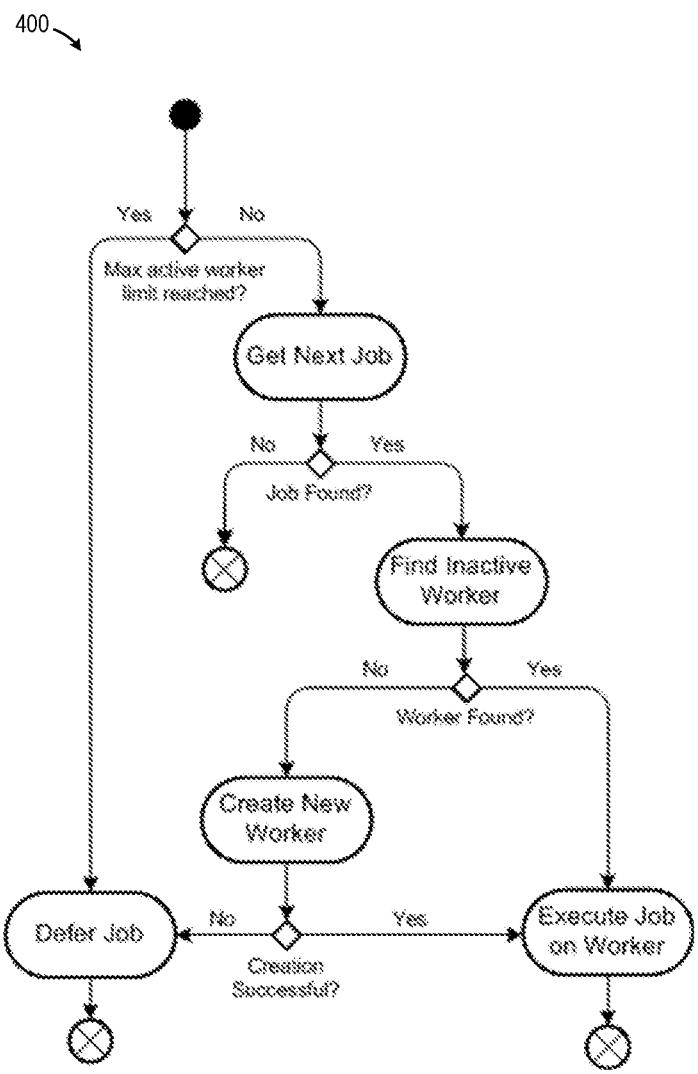
FIG. 4 is a flow diagram of a process according to some embodiments.

The executeNextJob method executes a next job for a specified job type, while accounting for resource constraints. FIG. 4 illustrates process 400 of the executeNextJob method according to some embodiments.

Initially, it is determined whether the maximum active worker thread limit is reached. If the limit has been reached, execution of the job is deferred such that an attempt to run the job will be made at a later time. Such a deferral may be implemented in JavaScript through setTimeout or similar mechanisms. If the limit has not been reached, a next job is retrieved from the job pool. If a job is found, an attempt is made to find an inactive worker thread for the job type. If such an inactive worker thread is not found, an attempt is made to create a new worker thread. If an inactive worker thread is found, or if worker thread creation is successful, the job is executed on the worker thread. Otherwise, the job is placed back into the job pool for deferred execution.

The attempt to create a new worker thread may be governed by the createWorker method. The createWorker method creates a worker thread for a specified job type and accounts for any specified resource constraints. For example, any inactive worker threads are pruned if the maximum number of worker threads limit has been reached. If the prune is successful and the limit is no longer reached, a new worker thread is created. If the prune is not successful or the maximum number of worker threads limit is still reached (i.e., the number of active worker threads equals the maximum number worker threads limit), a failure status is returned to the caller.

The clearInactiveWorkers method may be used to clear inactive worker threads. Such clearing may allow other worker threads to run. The cleanupWorkers method cleans up all worker thread contexts and pending jobs. Pending jobs may exist if, for example, the web application needs to close while jobs are pending. Clearing the pending jobs includes rejecting Promises associated with those jobs so the web application can respond appropriately.

In this regard, the worker manager may provide an API to the web application. Since operations pushed to worker threads are naturally asynchronous, some embodiments provide a Promise-driven API. A Promise is a proxy for a value which is not necessarily known when the Promise is created. A Promise allows handlers to be associated with an asynchronous action's eventual success value or failure reason. Instead of immediately returning a final value as in the case of a synchronous method, the asynchronous method returns a "promise" to supply the value at some point in the future.

According to some embodiments, the API comprises a registerWorkerContext function and an enqueueJob function. The registerWorkerContext function registers a specified worker thread context with a worker thread type and the enqueueJob function adds a job of a specified type to the job pool. The jobs of the job pool are processed in order by the next available worker thread of a corresponding type. The registerWorkerContext function parameters may include: type—worker type in the form of an enum or constant (e.g., "DATA_QUERY"); and context—worker context which can be a Uniform Resource Locator to a JavaScript resource containing either all the code needed for the worker thread or an in-memory function definition.

The enqueueJob function parameters may include: type—worker type; data—payload to send to worker, for example a JavaScript Object Notation object that includes both the action type (in the form of an enum/constant) and inputs for the job (e.g., {action: "DATA_QUERY", payload: {database: "ABC", table: "XYZ"}}). The enqueueJob function returns a Promise that will be resolved when the associated job has completed, or rejected if the job fails. Using such an API above, an application consumer can create arbitrary workers and jobs efficiently and with little regard to thread management.

Figure 5:
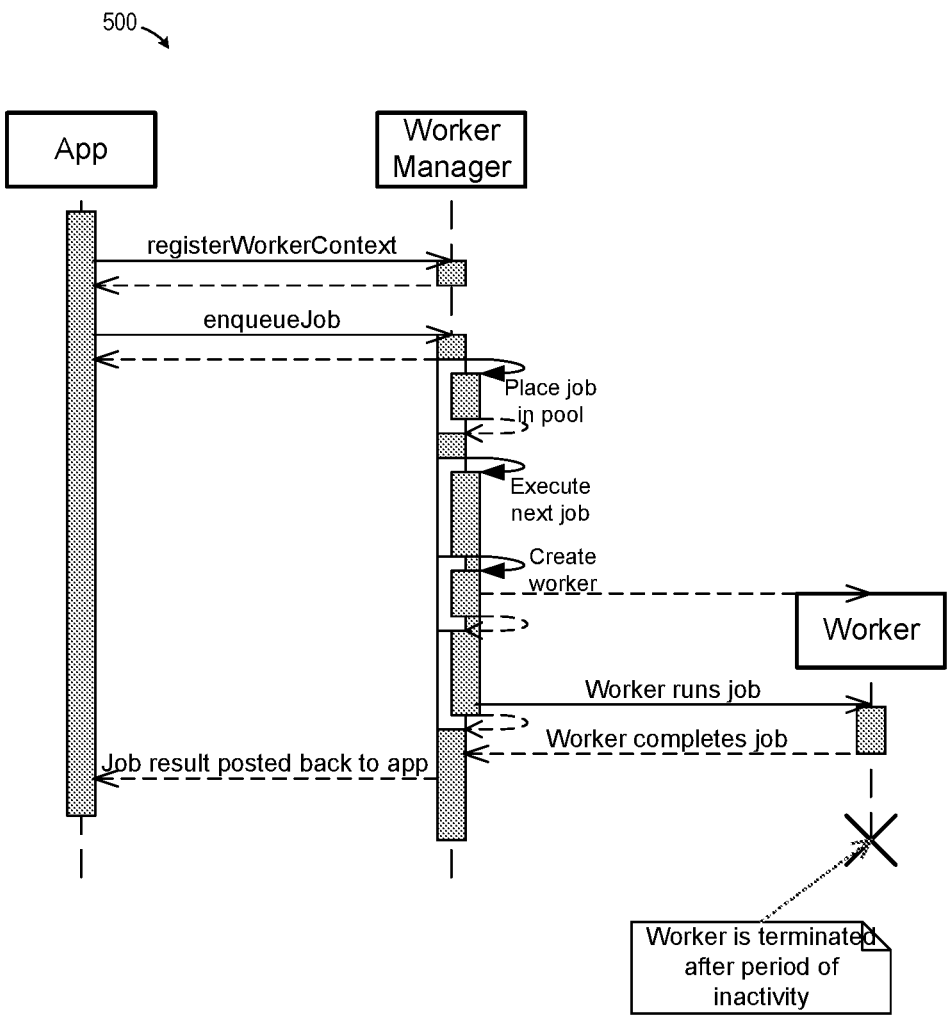
FIG. 5 is a sequence diagram of job execution according to some embodiments.

FIG. 5 demonstrates a basic workflow between an application and a worker manager based on the above API. As shown, the application calls the registerWorkerContext function to register a worker thread context with a worker thread type (e.g., context A is registered for worker threads of type A for executing Jobs of type A). Next, the enqueueJob function is called to add a job of a specified type to the job pool (e.g., to add Job 1 of type A). In response, the worker manager places the job in the job pool.

Flow then proceeds similarly to the description of FIGS. 3 and 4 above. The worker manager creates worker threads to execute the jobs in the job pool based on the job types and on resource constraints such as maximum number of worker threads, maximum number of active worker threads and maximum number of worker threads per job type. Upon completion of a job, the worker manager posts the job result back to the requesting application as shown. Worker threads may be terminated after a period of inactivity as described above.

According to some embodiments, the worker manager assigns worker threads to jobs based on job priority. For example, higher-priority jobs of the job pool may be assigned worker threads for execution before lower-priority jobs which were added to the job pool before the higher-priority jobs. In some embodiments, higher-priority jobs may preempt and either terminate or pause already-active jobs having lower priority.

Figure 6:
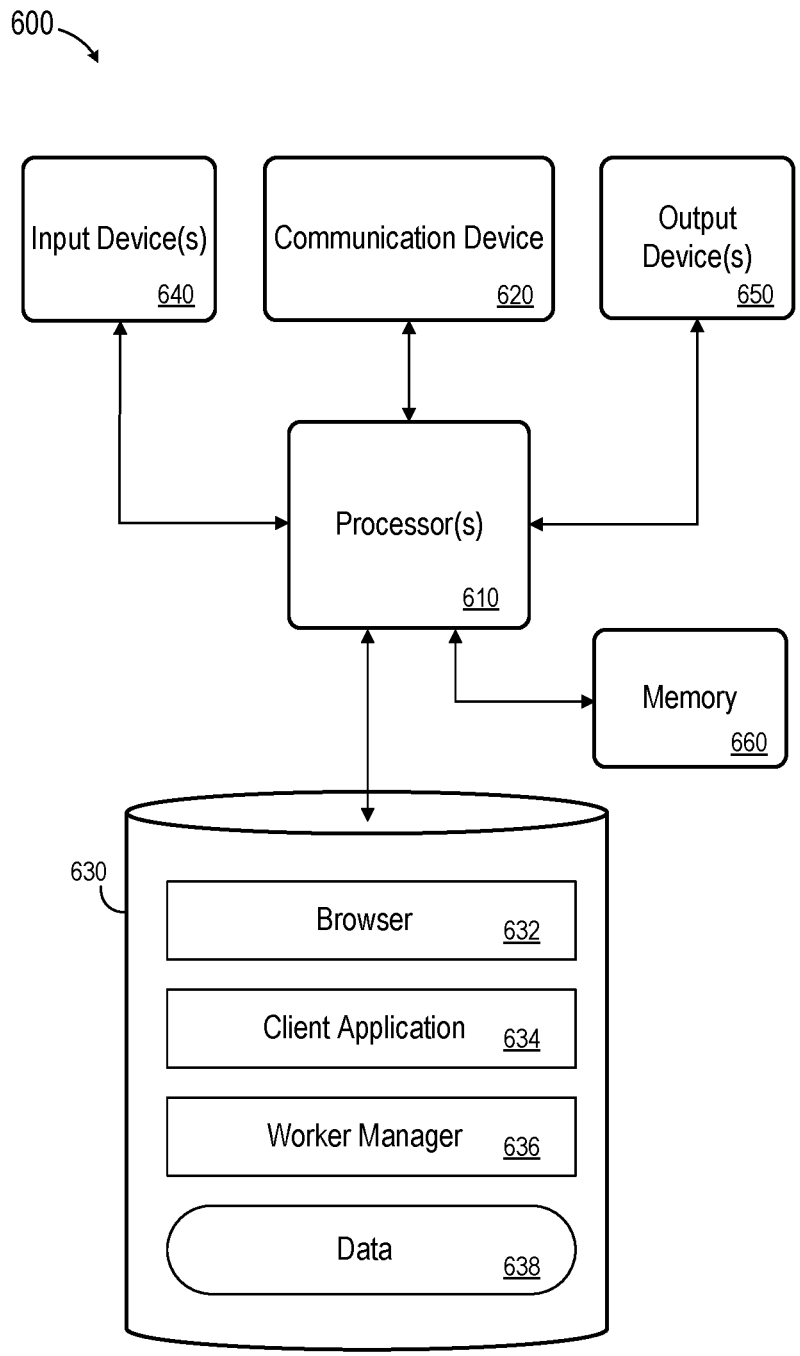
FIG. 6 is a block diagram of an apparatus according to some embodiments.

FIG. 6 is a block diagram of apparatus 600 according to some embodiments. Apparatus 600 may comprise a general-purpose computing apparatus and may execute program code to perform any of the functions described herein. Apparatus 600 may comprise an implementation of client system 140 as described above. Apparatus 600 may include other unshown elements according to some embodiments.

Apparatus 600 includes processor(s) 610 operatively coupled to communication device 620, data storage device 630, one or more input devices 640, one or more output devices 650 and memory 660. Communication device 620 may facilitate communication with external devices, such as a reporting client, or a data storage device. Input device(s) 640 may comprise, for example, a keyboard, a keypad, a mouse or other pointing device, a microphone, knob or a switch, an infra-red (IR) port, a docking station, and/or a touch screen. Input device(s) 640 may be used, for example, to enter information into apparatus 600. Output device(s) 650 may comprise, for example, a display (e.g., a display screen) a speaker, and/or a printer.

Data storage device 630 may comprise any appropriate persistent storage device, including combinations of magnetic storage devices (e.g., magnetic tape, hard disk drives and flash memory), optical storage devices, Read Only Memory (ROM) devices, etc., while memory 660 may comprise Random Access Memory (RAM), Storage Class Memory (SCM) or any other fast-access memory.

Browser 632 may comprise program code to provide an execution engine, while client application 634 may comprise program code executed by processor 610 (and within the execution engine) to cause apparatus 600 to perform any one or more of the processes described herein. To perform such processes, client application 634 may utilize program code of worker manager 636, which may implement the functionality described herein. Embodiments are not limited to execution of these processes by a single apparatus.

Data storage device 630 may also store data 638 and other program code for providing additional functionality and/or which are necessary for operation of apparatus 600, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A device comprising:
a memory storing processor-executable process steps; and
a processor to execute processor-executable process steps to:
receive at least a first job having a first type;
determine whether a current number of worker threads of a client application is less than a maximum worker thread limit, wherein a worker thread is adapted to execute a job;
upon determining that the current number of worker threads is less than the maximum worker thread limit:
(a) create a first worker thread adapted to execute the first job, wherein the first worker thread is tied to a first context capable of performing the first job,
(b) assign an available worker thread to the first job, wherein the available worker thread is tied to the first context capable of performing the first job; and
execute the first job with the worker thread;
upon determining that the current number of worker threads is the maximum worker thread limit:
determine an available worker thread for the first job;
assign the available worker thread to the first job; and
execute the first job on the available worker thread; and
upon determining the current number of worker threads is the maximum worker thread limit and a worker thread is not available for assignment to the first job:
prune one or more inactive worker threads;
create a first worker thread associated with the first context; and
execute the first job on the first worker thread.

2. A device according to claim 1, wherein the processor is to execute processor-executable process steps to:
receive a first instruction from the client application to register the first context;
receive a second instruction from the client application to enqueue the first job; and
in response to the second instruction, enqueue the first job in the job pool.

3. A device according to claim 2, wherein the processor is to execute processor-executable process steps to:
post a result of execution of the first job to the client application.

4. A device according to claim 1, further comprising process steps to:
determine, prior to assignment of the available worker thread to the first job, whether a current number of worker threads tied to the first context is less than a maximum worker thread limit per type for the first context; and
in a case that the current number of worker threads tied to the first context is less than the maximum worker thread limit per type for the first context, assign the available worker thread to the first job.

5. A computer-implemented method comprising:
- determining whether a current number of worker threads of a client application is less than a maximum worker thread limit, wherein a worker thread is adapted to execute a job;
- upon determining that the current number of worker threads is less than the maximum worker thread limit:
  - (a) creating a first worker thread adapted to execute the first job, wherein the first worker thread is tied to a first context capable of performing the first job, (b) assigning an available worker thread to the first job, wherein the available worker thread is tied to the first context capable of performing the first job; and
  - executing the first job with the worker thread;
- upon determining that the current number of worker threads is the maximum worker thread limit, determining an available worker thread for the first job, and assigning the available worker thread to the first job; and
- upon determining the current number of worker threads is the maximum worker thread limit and a worker thread is not available for assignment to the first job,
- pruning one or more inactive worker threads, creating a first worker thread associated with the first context, and executing the first job on the first worker thread.

6. A method according to claim 5, further comprising:
- receiving a first instruction from the client application to register the first context;
- receiving a second instruction from the client application to enqueue the first job; and
- in response to the second instruction, enqueuing the first job in the job pool.

7. A method according to claim 6, further comprising:
- posting a result of execution of the first job to the client application.

8. A method according to claim 5, further comprising:
- determining, prior to assignment of the available worker thread to the first job, whether a current number of worker threads tied to the first context is less than a maximum worker thread limit per type for the first context; and
- in a case that the current number of worker threads tied to the first context is less than the maximum worker thread limit per type for the first context, assigning the available worker thread to the first job.

9. A non-transitory computer-readable medium storing computer-executable process steps which, when executed by a computing device, provide a web worker manager to:
- receive a first instruction from a client application to register a first context;
- receive a second instruction from the client application to enqueue a first job associated with the first context, wherein the first context is capable of performing the first job;
- in response to the second instruction, enqueue the first job in a job pool;
- determine whether a current number of worker threads of the client application is less than a maximum worker thread limit, wherein a worker thread is adapted to execute a job;
- upon determining that the number of worker threads is less than the maximum worker thread limit:
  - (a) create a first worker thread adapted to execute the first job, wherein the first worker thread is tied to a first context capable of performing the first job, (b) assign an available worker thread to the first job, wherein the available worker thread is tied to the first context capable of performing the first job; and
  - execute the first job with the worker thread;
- upon determining that the number of worker threads is the maximum worker thread limit:
  - determine an available worker thread for the first job;
  - assign the available worker thread to the first job; and
  - execute the first job on the available worker thread; and
- upon determining the current number of worker threads is the maximum worker thread limit and a worker thread is not available for assignment to the first job:
  - prune one or more inactive worker threads;
  - create a first worker thread associated with the first context; and
  - execute the first job on the first worker thread.

10. A non-transitory medium according to claim 9, the web worker manager further to: post a result of execution of the first job to the client application.

11. A non-transitory medium according to claim 9, wherein the client application comprises a JavaScript application.

12. A non-transitory medium, according to claim 9, the web worker manager further to:
- determine, prior to assignment of the available worker thread to the first job, whether a current number of worker threads associated with the first context is less than a maximum worker thread limit per type for the first context; and
- in a case that the current number of worker threads associated with the first context is less than the maximum worker thread limit per type for the first context, assign the available worker thread to the first job.

* * * * *